United States Patent
Skärby et al.

(10) Patent No.: US 10,123,362 B2
(45) Date of Patent: Nov. 6, 2018

(54) OPERATION OF A MULTI-STANDARD BASE STATION SITE SUPPORTING AT LEAST TWO DIFFERENT RADIO ACCESS TECHNOLOGIES

(71) Applicant: TELEFONAKTIEBOLAGET LM ERICSSON (PUBL), Stockholm (SE)

(72) Inventors: Ulf Skärby, Lidingö (SE); Farshid Ghasemzadeh, Sollentuna (SE); Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 189 days.

(21) Appl. No.: 15/105,846

(22) PCT Filed: Dec. 18, 2013

(86) PCT No.: PCT/SE2013/051561
§ 371 (c)(1),
(2) Date: Jun. 17, 2016

(87) PCT Pub. No.: WO2015/094045
PCT Pub. Date: Jun. 25, 2015

(65) Prior Publication Data
US 2017/0041975 A1    Feb. 9, 2017

(51) Int. Cl.
*H04W 4/00* (2018.01)
*H04W 76/02* (2009.01)
(Continued)

(52) U.S. Cl.
CPC ........ *H04W 76/026* (2013.01); *H04B 7/0639* (2013.01); *H04B 17/14* (2015.01); *H04W 72/0453* (2013.01); *H04W 76/16* (2018.02)

(58) Field of Classification Search
CPC ............... H04W 76/026; H04W 76/16; H04W 72/0453; H04B 7/0639; H04B 17/14
See application file for complete search history.

(56) References Cited

U.S. PATENT DOCUMENTS 7,733,975 B1 * 6/2010 Tsai ..................... H04L 1/0606
375/260
8,243,834 B2 * 8/2012 Kishigami ............. H04B 7/084
375/260

(Continued)

FOREIGN PATENT DOCUMENTS

WO    2010087749 A1    8/2010
WO    2013119152 A1    8/2013

*Primary Examiner* — Kevin Mew
(74) *Attorney, Agent, or Firm* — Sage Patent Group

(57) ABSTRACT

In a multi-standard base station (BS) site, a first (BS) module operates in multi-antenna transmission mode according to a first radio access technology (RAT) by means of multiple transmitter branches. The first BS module determines phase/time compensation information based on UE feedback information representative of precoding matrix index, PMI. The multi-standard BS site performs, for operation according to the first RAT, a first compensation for a relative phase/time error between at least two of the transmitter branches based on the phase/time compensation information. A second BS module operates for transmission according to a second RAT by means of at least two of the multiple transmitter branches. The multi-standard BS site performs, for operation according to the second RAT, a second compensation for a relative phase/time error between at least two of the transmitter branches based on the phase/time compensation information from the first BS module.

15 Claims, 10 Drawing Sheets

(51) Int. Cl.
*H04B 17/14* (2015.01)
*H04B 7/06* (2006.01)
*H04W 72/04* (2009.01)
*H04W 76/16* (2018.01)

(56) References Cited

U.S. PATENT DOCUMENTS

| | | | |
|---|---|---|---|
| 8,537,948 B2 | 9/2013 | Przada et al. | |
| 9,288,691 B2* | 3/2016 | Park | H04B 7/024 |
| 9,825,739 B2* | 11/2017 | Miyanaga | H04L 5/0007 |
| 2004/0085239 A1* | 5/2004 | Ukena | H01Q 19/30 |
| | | | 342/81 |
| 2005/0047384 A1* | 3/2005 | Wax | H04W 72/046 |
| | | | 370/338 |
| 2007/0117559 A1* | 5/2007 | Trivedi | H04W 24/00 |
| | | | 455/423 |
| 2008/0287076 A1* | 11/2008 | Shen | H04B 1/0475 |
| | | | 455/114.3 |
| 2010/0054200 A1* | 3/2010 | Tsai | H04B 7/0408 |
| | | | 370/329 |
| 2011/0075715 A1* | 3/2011 | Kravitz | H04B 1/30 |
| | | | 375/221 |
| 2013/0039401 A1* | 2/2013 | Han | H04B 7/0617 |
| | | | 375/222 |
| 2013/0121240 A1 | 5/2013 | Przada et al. | |
| 2014/0226612 A1* | 8/2014 | Kim | H04B 7/024 |
| | | | 370/329 |
| 2014/0376652 A1* | 12/2014 | Sayana | H04B 7/0639 |
| | | | 375/267 |
| 2015/0207547 A1* | 7/2015 | Ko | H04B 7/0456 |
| | | | 370/252 |
| 2015/0280841 A1* | 10/2015 | Gudovskiy | H04B 17/20 |
| | | | 375/226 |
| 2015/0381266 A1* | 12/2015 | Fujimura | H04B 7/18515 |
| | | | 370/318 |
| 2017/0063500 A1* | 3/2017 | Miyanaga | H04L 5/0007 |
| 2017/0288759 A1* | 10/2017 | Namgoong | H04B 7/0639 |
| 2017/0373746 A1* | 12/2017 | Chang | H04B 7/18515 |

* cited by examiner

US 10,123,362 B2

OPERATION OF A MULTI-STANDARD BASE STATION SITE SUPPORTING AT LEAST TWO DIFFERENT RADIO ACCESS TECHNOLOGIES

This application is a 371 of International Application No. PCT/SE2013/051561, filed Dec. 18, 2013, the disclosure of which is fully incorporated herein by reference.

TECHNICAL FIELD

The proposed technology generally relates to a method of operating a multi-standard base station site supporting at least two different radio access technologies, a method of transmitter branch calibration in a multi-standard base station site, and corresponding multi-standard base station sites.

BACKGROUND

Modern radio access technologies such as Long Term Evolution, LTE, for example generally support advanced multi-antenna features such as Spatial Multiplexing, also referred to as Multiple Input Multiple Output, MIMO. This means that the corresponding base station deployments are equipped with multiple antennas and associated transmitters.

Such a multi-antenna enabled system can be deployed as a stand-alone system, e.g. a stand-alone LTE system, or deployed together with one or more other radio access technologies such as Code Division Multiple Access, CDMA, or Wideband Code Division Multiple Access, WCDMA, or even Global System for Mobile communications, GSM.

In the latter case, in a so-called co-sited deployment, also referred to as a multi-standard base station site, the other radio access technologies are typically not designed for multi-antenna operation, or at least not optimized for such operation, and can therefore not fully exploit the available radio and multi-antenna infrastructure.

There is thus a general demand for multi-standard base station sites with improved capabilities.

SUMMARY

It is an object to be able to more efficiently utilize the available radio and multi-antenna infrastructure in a multi-standard base station.

It is a specific object to provide a method of operating a multi-standard base station site supporting at least two different radio access technologies.

It is another specific object to provide a method of transmitter branch calibration in a multi-standard base station site supporting at least two different radio access technologies.

It is also a specific object to provide a multi-standard base station site supporting at least two different radio access technologies.

These and other objects are met by embodiments of the proposed technology.

According to a first aspect, there is provided a method of operating a multi-standard base station site supporting at least two different radio access technologies. The multi-standard base station site comprises a first base station module adapted for a first radio access technology and a second base station module adapted for a second radio access technology, and a common radio and multi-antenna infrastructure for the base station modules comprising multiple transmitter branches. At least the first base station module comprises a precoder for precoding information symbols by means of a precoding matrix for multi-antenna transmission to a number of user equipment terminals. The first base station module operates in multi-antenna transmission mode according to the first radio access technology by means of the multiple transmitter branches. The first base station module determines phase/time compensation information based on feedback information representative of precoding matrix index, PMI, from at least one of the user equipment terminals. The multi-standard base station site performs, for operation according to the first radio access technology, a first compensation for a relative phase/time error between at least two of the transmitter branches based on the phase/time compensation information. The second base station module operates for transmission according to the second radio access technology by means of at least two of the multiple transmitter branches. For operation according to the second radio access technology, the multi-standard base station site performs a second compensation for a relative phase/time error between at least two of the transmitter branches based on the phase/time compensation information from the first base station module.

In this way, the available radio and multi-antenna infrastructure can be efficiently utilized for the first radio access technology as well as the second radio access technology. In particular, the second base station module can operate for transmission according to the second radio access technology by means of two or more of the multiple transmitter branches, while compensation for a relative phase/time error between at least two of the transmitter branches is ensured for this radio access technology also. This means that available antenna output power can be more efficiently exploited for the second radio access technology. The phase/time compensation information determined by the first base station module is thus used not only for the first radio access technology, but also re-used for the second radio access technology.

According to a second aspect, there is provided a method of transmitter branch calibration in a multi-standard base station site supporting at least two different radio access technologies. The multi-standard base station site comprises a first base station module adapted for a first radio access technology and a second base station module adapted for a second radio access technology, and a common radio and multi-antenna infrastructure for the first and second base station modules comprising multiple transmitter branches. At least the first base station module comprises a precoder for precoding information symbols by means of a precoding matrix for multi-antenna transmission to a number of user equipment terminals. The first base station module operates in multi-antenna transmission mode according to the first radio access technology by means of the multiple transmitter branches. The first base station module determines phase/time compensation information based on feedback information representative of precoding matrix index, PMI, from at least one of the user equipment terminals. The first base station module sends the phase/time compensation information to the second base station module. The second base station module operates for transmission according to the second radio access technology by means of at least two of the multiple transmitter branches. The second base station module calibrates, for operation according to the second radio access technology, at least one of the transmitter branches to compensate for a relative phase/time error between at least two of the transmitter branches based on the phase/time compensation information from the first base station module.

This means that the second base station module can calibrate, for operation according to a second radio access technology, at least one of the transmitter branches to compensate for a relative phase/time error between branches based on phase/time compensation information determined by the first base station module operating according to a first radio access technology.

According to a third aspect, there is provided a multi-standard base station site supporting at least two different radio access technologies. The multi-standard base station site comprises a first base station module adapted for a first radio access technology, a second base station module adapted for a second radio access technology, and a common radio and multi-antenna infrastructure for the first and second base station modules comprising multiple transmitter branches. At least the first base station module comprises a precoder configured to precode information symbols by means of a precoding matrix for multi-antenna transmission to a number of user equipment terminals. The first base station module is configured to operate in multi-antenna transmission mode according to the first radio access technology by means of the multiple transmitter branches. The first base station module is also configured to determine phase/time compensation information based on feedback information representative of precoding matrix index, PMI, from at least one of the user equipment terminals. The multi-standard base station site is configured to perform, for operation according to the first radio access technology, a first compensation for a relative phase/time error between at least two of the transmitter branches based on the phase/time compensation information. The second base station module is configured to operate for transmission mode according to the second radio access technology by means of at least two of the multiple transmitter branches. The multi-standard base station site is further configured to perform, for operation according to the second radio access technology, a second compensation for a relative phase/time error between at least two of the transmitter branches based on the phase/time compensation information from the first base station module.

This provides a multi-standard base station site that efficiently utilizes the available radio and multi-antenna infrastructure.

According to a fourth aspect, there is provided a multi-standard base station site supporting at least two different radio access technologies. The multi-standard base station site comprises a first base station module adapted for a first radio access technology, a second base station module adapted for a second radio access technology, and a common radio and multi-antenna infrastructure for the first and second base station modules comprising multiple transmitter branches. At least the first base station module comprises a precoder configured to precode information symbols by means of a precoding matrix for multi-antenna transmission to a number of user equipment terminals. The first base station module is configured to operate in multi-antenna transmission mode according to the first radio access technology by means of the multiple transmitter branches. The first base station module is configured to determine phase/time compensation information based on feedback information representative of precoding matrix index, PMI, from at least one of the user equipment terminals. The first base station module is also configured to send the phase/time compensation information to the second base station module. The second base station module is configured to operate for transmission according to the second radio access technology by means of at least two of the multiple transmitter branches. The second base station module is configured to calibrate, for operation according to the second radio access technology, at least one of the transmitter branches to compensate for a relative phase/time error between at least two of the transmitter branches based on the phase/time compensation information from the first base station module.

This provides a multi-standard base station site enabling efficient transmitter branch calibration.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

It is well-known that the use of multiple antennas at the transmitter and/or the receiver can significantly boost the performance of a wireless system. Such antenna configurations have the potential of both improving data rates and increasing coverage.

Therefore, modern base station deployments are often equipped with multiple antennas and associated transmitters. Such a multi-antenna enabled system can be deployed as a stand-alone system, e.g. a stand-alone LTE system, or deployed together with one or more other radio access technologies, RATs, such as Code Division Multiple Access, CDMA, or Wideband Code Division Multiple Access, WCDMA, or even Global System for Mobile communications, GSM. The latter case refers to a so-called multi-standard base station site.

Figure 1:
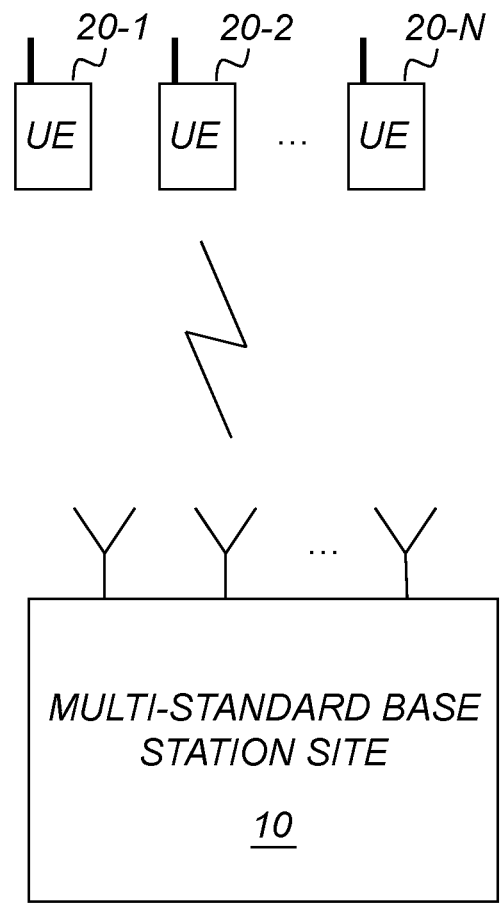
FIG. 1 is a schematic diagram illustrating a multi-standard radio base station site serving a number of user equipment, UE, terminals.

FIG. 1 is a schematic diagram illustrating a multi-standard radio base station site serving a number of user equipment, UE, terminals. The multi-standard radio base station site 10 is configured for communication with a number, N, of user equipment, UE, terminals 20-1, 20, 2, . . . , 20-N.

Figure 2:
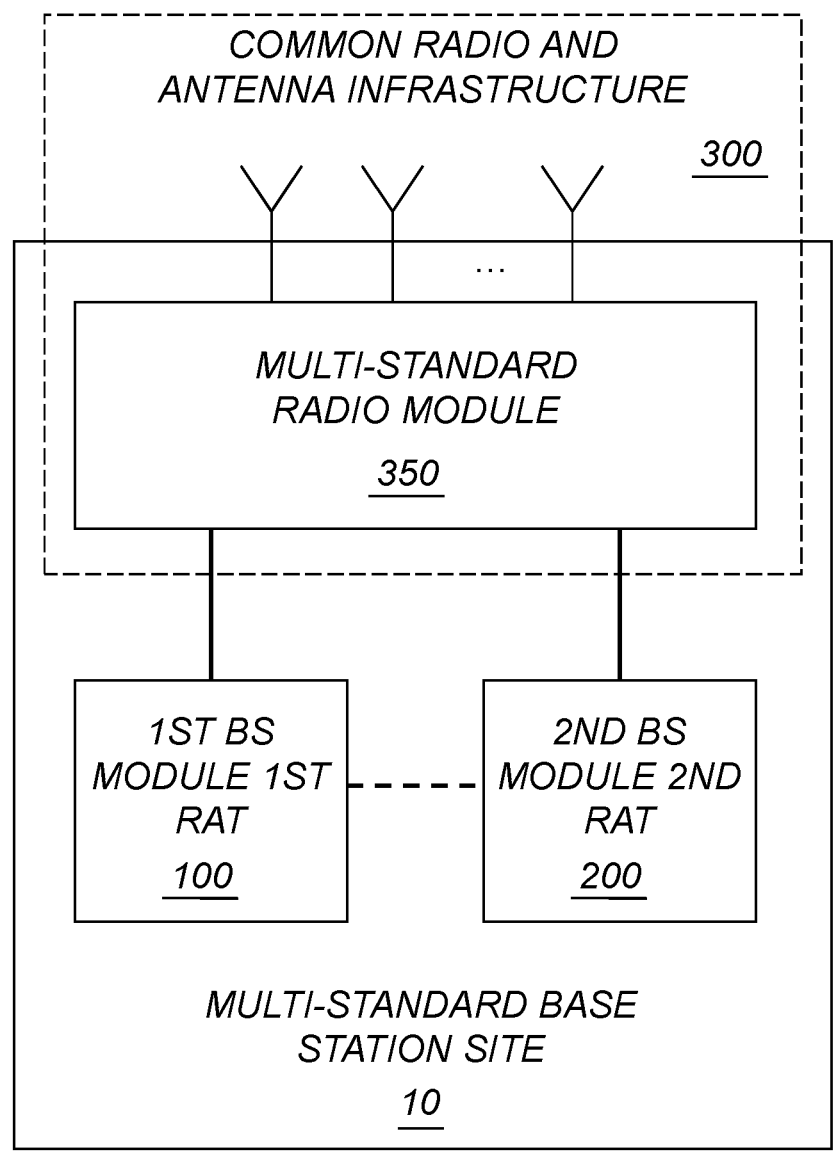
FIG. 2 is a schematic block diagram illustrating an example of a multi-standard radio base station site supporting at least two different radio access technologies according to an embodiment.

FIG. 2 is a schematic block diagram illustrating an example of a multi-standard radio base station site supporting at least two different radio access technologies according to an embodiment. The multi-standard base station site 10 basically comprises a first base station module 100 adapted for a first radio access technology, RAT, and a second base station module 200 adapted for a second RAT, and a common radio and multi-antenna infrastructure 300 for the base station modules comprising multiple transmitter branches, sometimes referred to as transmitter or radio chains.

It should be understood that the multi-standard base station site 10 may support more than two different radio access technologies, and there may then be more than two base station modules.

As mentioned, some of the supported radio access technologies may not initially be designed for multi-antenna operation, or at least not optimized for such operation, and can therefore not fully exploit the available radio and multi-antenna infrastructure. It is therefore desirable to be able to more efficiently utilize the available radio and multi-antenna infrastructure in a multi-standard base station.

Figure 3:
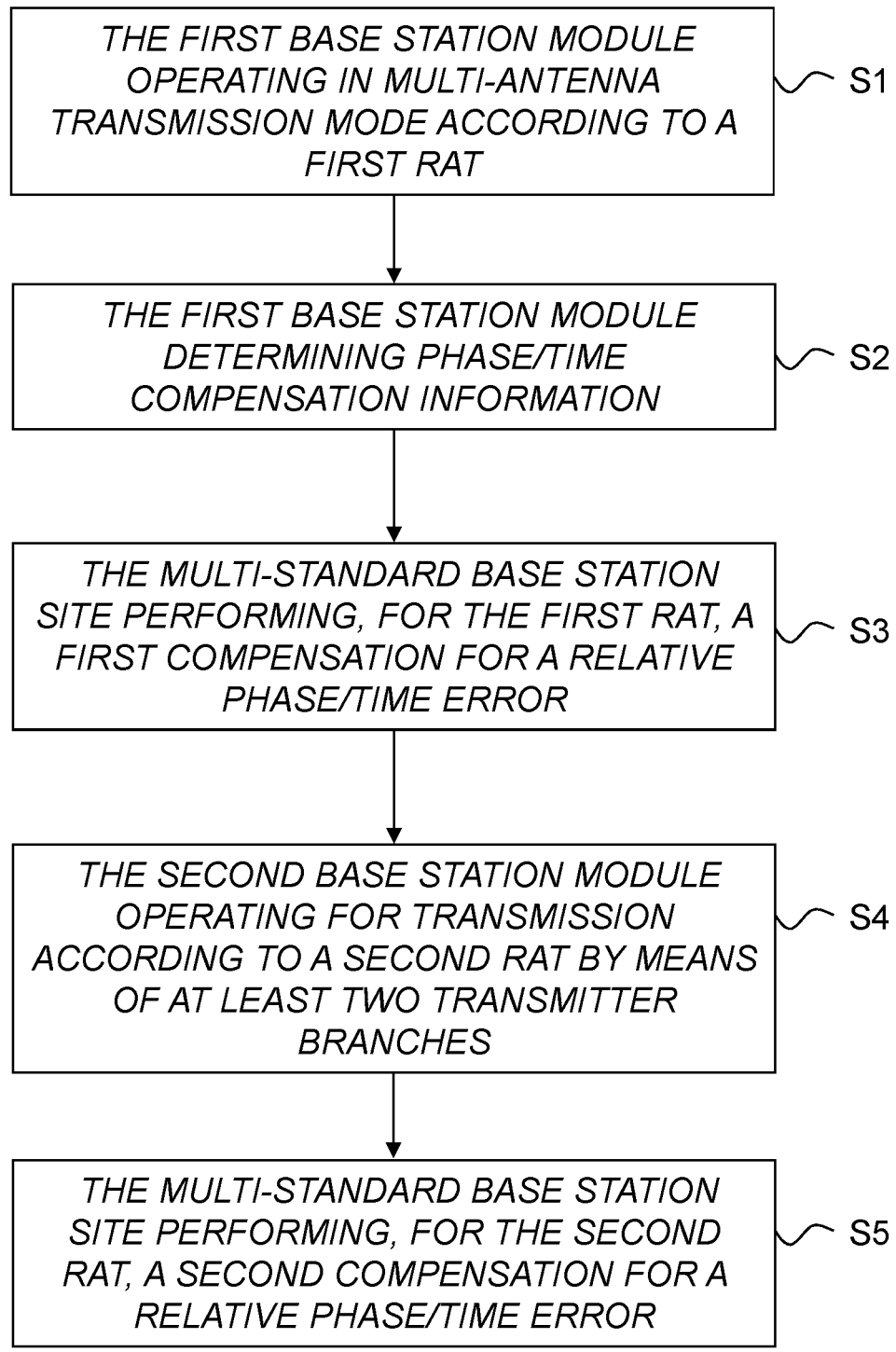
FIG. 3 is a schematic flow diagram illustrating an example of a method of operating a multi-standard base station site supporting at least two different radio access technologies according to an embodiment.

As illustrated in the schematic diagram of FIG. 3, there is provided a method of operating a multi-standard base station site supporting at least two different radio access technologies.

As outlined above, the multi-standard base station site 10 basically comprises a first base station module 100 adapted for a first radio access technology and a second base station module 200 adapted for a second radio access technology, and a common radio and multi-antenna infrastructure 300 for the base station modules comprising multiple transmitter branches.

At least the first base station module 100 comprises a precoder for precoding information symbols by means of a precoding matrix for multi-antenna transmission to a number of user equipment terminals.

Step S1 involves the first base station module operating in multi-antenna transmission mode according to the first radio access technology, RAT, by means of the multiple transmitter branches.

Step S2 involves the first base station module determining phase/time compensation information based on feedback information representative of precoding matrix index, PMI, from at least one of the user equipment terminals.

Step S3 involves the multi-standard base station site performing, for operation according to the first radio access technology, a first compensation for a relative phase/time error between at least two of the transmitter branches based on the phase/time compensation information.

Step S4 involves the second base station module operating for transmission according to the second radio access technology, RAT, by means of at least two of the multiple transmitter branches.

Step S5 involves the multi-standard base station site performing, for operation according to the second radio access technology, a second compensation for a relative phase/time error between at least two of the transmitter branches based on the phase/time compensation information from the first base station module.

In this way, the second base station module can operate for transmission according to the second radio access technology by means of two or more of the multiple transmitter branches, while compensation for a relative phase/time error between at least two of the transmitter branches is ensured for this radio access technology. This means that available antenna output power can be more efficiently exploited for the second radio access technology. The phase/time compensation information determined by the first base station module is thus used not only for the first radio access technology, but also re-used for the second radio access technology.

As indicated above, at least the first base station module 100 comprises a precoder for precoding information symbols by means of a precoding matrix for multi-antenna transmission to a number of user equipment terminals.

Precoding is a popular multi-antenna technique for improving the performance of a multi-antenna system by transforming the information carrying transmit vector so that it better fits the channel conditions. This can be done based on instantaneous channel information or long term channel information or some combination thereof. Often, precoding is implemented as performing a (linear) transformation on the information carrying vector prior to transmission. Such transformation is usually represented by a matrix.

When antenna elements are closely spaced, and thus the radio channels typically are correlated, a beam is generated when the precoding matrix from the codebook is applied. The codebook in LTE, for example, is designed for, or at least best suited for, a scenario where the transmitter branches or radio chains are coherent. This means that if the coherency is not sufficient performance will be degraded. Although time and phase are intimately interrelated, the requirements on time coherency and phase coherency may be quite different. Although there may be time coherency (signal bandwidth related) in a system, the phase (carrier frequency related) may still be more or less random.

For example, for a scheme with multiple antennas in the base station and one or more antennas at the UE, the difference in phase for different paths may be composed by several contributions:

$$\Delta\varphi = \varphi_{channel} + \varphi_{time\_err} + \varphi_{phase\_err} + \varphi_{antenna} + \varphi_{DOA}$$

The character of the different contributions differs. The channel contribution is a result of channels not being perfectly correlated and is thus varying as the channels fade. The time error arises due to different timing errors in the base station, such as different delays in filters and different feeder lengths. Thus timing-difference-induced phase errors are more or less constant over time but frequency-dependent. A phase error may arise, for example from phase-locked loops locking at different phases and may be regarded as constant, both over time and frequency. The antenna contribution models the fact that antenna elements typically are not identical, for example between central and edge elements in an array. Finally, the DOA (direction of arrival) contribution is due to different path lengths between a UE and the individual elements depending on the direction of arrival.

In the LTE standard, for example, there is a requirement that transmitter branches or radio chains shall be time aligned such that the time difference between any two branches or chains at the antenna port fulfills:

$$\delta_k = |\tau_k - \tau_{ref}| = < 65 \ ns.$$

As already mentioned the time difference will cause the phase relation between branches to be frequency dependent. Over a bandwidth of 20 MHz the maximum time difference can be transformed to a maximum phase difference of 468 degrees:

$$\Delta \varphi_{time\_err} = 2\pi \Delta f \delta_k$$

However, the precoding vectors may be selected for only a portion of the bandwidth, per sub-band. This means that the phase error due to time errors can be much smaller. For example, if the total bandwidth of 20 MHz is divided into 8 sub-bands the maximum phase difference over frequency, within a sub-band, will be 58.5 degrees.

In addition to the frequency-varying phase shift one can expect, for example due to slightly different feeder lengths, the phase to have a random offset (at least in practice not frequency-dependent) of [0, 360] degrees.

The phase in branch k may then be modeled as:

$$\varphi(k, f, \delta_k) = \varphi_{0,k} + 2\pi f \delta_k,$$

where $\varphi_{0,k}$ models the constant phase offset and the second component models the frequency-dependent phase shift, where f denotes the frequency of the sub-band of interest.

When precoding is applied for downlink transmission, user equipment terminals normally report the preferred precoding matrix index, PMI, or equivalent representation or indication of precoding matrix. For site installations where antennas are located such that the received signals are correlated, the preferred matrix indices can be used as a measure of phase/time coherency between the transmitter branches or radio chains, especially when frequency-dependent pre-coding (per sub-band) is used.

Consequently, relevant information on the phase coherency situation can be obtained in an efficient manner by analyzing already existing feedback information from the user equipment terminals to the radio base station. This also enables sufficient phase/time coherency between transmitter branches when a corresponding compensation is applied.

When compensating for relative phase/time errors between transmitter branches or radio chains, constant or at least basically frequency-independent errors and/or frequency-dependent errors may be considered.

By way of example, it is possible to compensate for the total relative phase error per frequency sub-band, i.e. per carrier.

Alternatively, the timing-induced, frequency-dependent phase error component(s) is/are compensated for first, and then the constant phase error component(s) is/are compensated for.

The actual compensation can be executed in the time and/or frequency domain. For example, as a time delay in the time domain and/or a frequency-dependent phase shift in the frequency domain. Examples of suitable structures for implementing controllable time delays and/or phase shifts include a Tapped Delay Line or a Multi-Tap Equalizer, or equivalent filter representation. A phase shift in the frequency domain may for example be implemented as a multiplication by a coefficient $\exp^{i \cdot \varphi}$, where $\varphi$ is the desired phase shift.

For additional information on methods and implementations for compensating for relative phase/time errors between transmitter branches to obtain sufficient phase/time coherency, reference can be made to [1-4].

By way of example, the multi-standard base station site 10 may perform, for operation according to the first radio access technology, the first compensation in the first base station module 100 or in a multi-standard radio module 350 of the common radio and antenna infrastructure 300. The multi-standard base station site 10 may perform, for operation according to the second radio access technology, the second compensation in the second base station module 200 or in the multi-standard radio module 350 of the common radio and antenna infrastructure 300.

The first base station module 100 may send the phase/time compensation information to the second base station module 200 or the multi-standard radio module 350 of the common radio and antenna infrastructure 300 to enable, for operation according to the second radio access technology, the second compensation for a relative phase/time error between at least two of the transmitter branches based on the phase/time compensation information.

For example, the first base station module 100 may send the phase/time compensation information to the second base station module 200, and the second base station module 200 may then perform, for operation according to the second radio access technology, the second compensation in the digital domain.

Figure 5A:
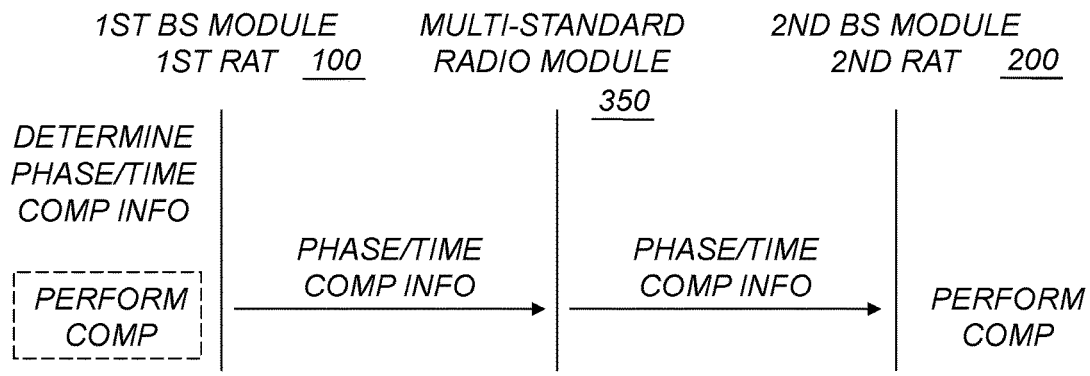
FIG. 5A is a schematic signaling diagram illustrating an example of signaling between different modules in a multi-standard radio base station site according to an embodiment.

In a particular example, as illustrated in FIG. 5A, the phase/time compensation information is sent from the first base station module 100 via a first link to the multi-standard radio module 350, and from the multi-standard radio module 350 via a second link to the second base station module 200.

Figure 5B:
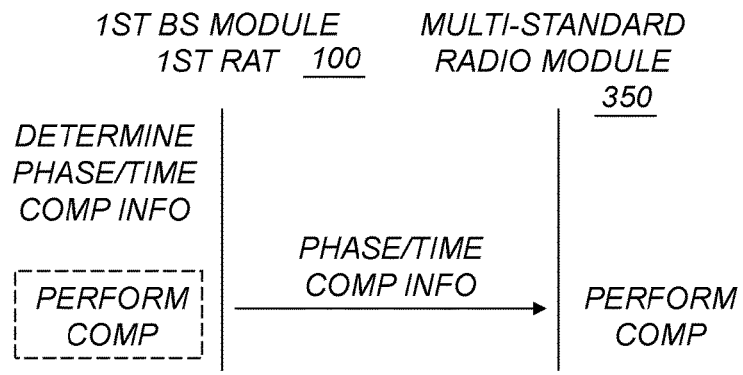
FIG. 5B is a schematic signaling diagram illustrating another example of signaling between different modules in a multi-standard radio base station site according to an embodiment.

In another example, as illustrated in FIG. 5B, the first base station module 100 sends the phase/time compensation information to the multi-standard radio module 350, and the common multi-standard radio module 350 performs, for operation according to the second radio access technology, the second compensation in the analog or digital domain.

As an example, the first base station module 100 may send the phase/time compensation information to the second base station module 200 or the multi-standard radio module 350 via one or more Common Public Radio Interface, CPRI, link(s), Open Base Station Architecture Initiative, OBSAI, interface(s), and/or Optical Transmission Infrastructure, OTI, interface(s).

Figure 5C:
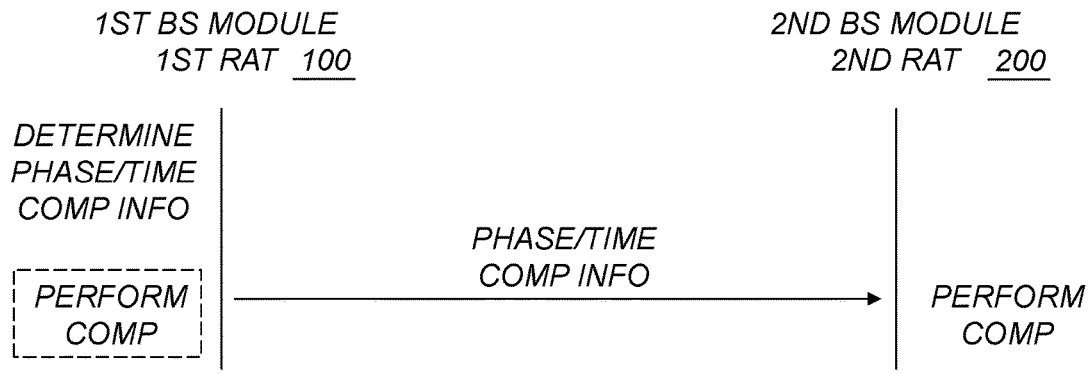
FIG. 5C is a schematic signaling diagram illustrating yet another example of signaling between different modules in a multi-standard radio base station site according to an embodiment.

In yet another example, as illustrated in FIG. 5C, the phase/time compensation information is sent from the first base station module 100 via a direct link to the second base station module 200.

Preferably, although not necessarily, the multi-standard base station site 10 may perform, for operation according to the second radio access technology, the second compensation for a relative phase/time error between at least two of the transmitter branches based on the phase/time compensation information, while adjusting for a difference in signal bandwidth and/or a difference in operating frequency between the first radio access technology and the second radio access technology.

In the latter case, the difference in operating frequency may for example be a difference in carrier frequency between the first radio access technology and the second radio access technology.

For example, the multi-standard base station site 10 may perform, for operation according to the second radio access technology, the second compensation for a relative phase/time error between at least two of the transmitter branches based on the phase/time compensation information, while adjusting for a change in phase/time originating from at least one frequency-dependent component of the transmitter branch(es) when operating at the frequency of the second radio access technology instead of the frequency of the first radio access technology.

Such an adjustment for a change in phase/time originating from at least one frequency-dependent component of the transmitter branch(es) may for example be performed based on information representative of a difference in filter characteristics at different operating frequencies.

Alternatively, the first base station module 100 may be operating, during a period of time, in multi-antenna transmission mode according to the first radio access technology, but at the operating frequency of the second radio access technology, and determine the phase/time compensation information based on feedback information representative of precoding matrix index, PMI, from at least one of the user equipment terminals during this period of time.

The proposed technology is generally applicable to various radio access technologies. By way of example, the first radio access technology may be Long Term Evolution, LTE and the second radio access technology may be Code Division Multiple Access, CDMA, or Wideband Code Division Multiple Access, WCDMA.

As an example, a vast majority of today's LTE deployments have MIMO/Spatial multiplexing embedded and thus, in sites with LTE there is often a need for multiple transmitters and antennas to support MIMO/Spatial multiplexing. For WCDMA/HSPA, MIMO is not always deployed and consequently not the same need for base station equipment with multiple transmitters and antennas. In the context of migration scenarios with a multi-standard base station in multi-RAT operation mode for LTE-WCDMA/HSPA there is a potential problem with antenna lobes when the same signal is transmitted from different antennas since there is interaction between the antennas forming unwanted lobes considering WCDMA/HSPA.

No embedded calibration loop exists in today's radios. Even if calibration is implemented in the radio, there is still a problem for systems where long feeder cables are used between the radio and the antenna system. Similarly, if e.g., external filters, combiners and so forth are deployed between the calibrated radio and the antenna system, an unknown phase error between the transmitter antennas may still exist.

Under certain circumstances, this problem can possibly be solved for a WCDMA by assigning different power amplifiers/antennas to different carriers or let different polarization form the wanted isolation. It is also possible to use a pre-coder together with different polarization to get power pooling for using the power amplifiers in the most efficient way.

However, when more than two transmission branches are available the polarization domain cannot be used to power combine since there is only two orthogonal polarization states. Hence, a multiway pre-coder using Virtual Antenna Mapping, VAM, cannot easily be used. For a multiway pre-coder, a certain level of coherency is needed.

The proposed technology enables the required level of phase coherency to avoid the unwanted lobes.

Below, a few examples of possible application scenarios are outlined. By way of example, the first RAT may be LTE using 4, 8 or more antennas for transmission. The second RAT may be CDMA or WCDMA with 2, 4 or more antennas for transmission, with or without using different polarization states.

For example, when using different polarization in (W)CDMA, the proposed technology makes it possible to extend the number of used transmitter branches to four or more branches without forming unwanted lobes. Without different polarization, the proposed technology makes it possible to transmit the same signal in (W)CDMA from two or more antennas without forming unwanted lobes.

In a particular example, the second base station module 200 is operating for transmission according to the second radio access technology by means of more than two of the multiple transmitter branches.

There are different ways of determining the phase/time compensation information based on the UE feedback. For example, the first base station module 100 may compile precoding matrix statistics representative of the phase/time coherency between at least two of the transmitter branches based on feedback information representative of precoding matrix index, PMI, from one or more of the user equipment terminals collected over time, and determine the phase/time compensation information based on the precoding matrix statistics.

For example, it is possible to determine the phase/time compensation information by estimating magnitude and sign of a phase/time compensation value for at least one of the transmitter chains based on the feedback information representative of precoding matrix index, PMI, from at least one of the user equipment terminals.

A second aspect of the proposed technology is directed to transmitter branch calibration, focusing on calibration for operation according to the second radio access technology.

Figure 4:
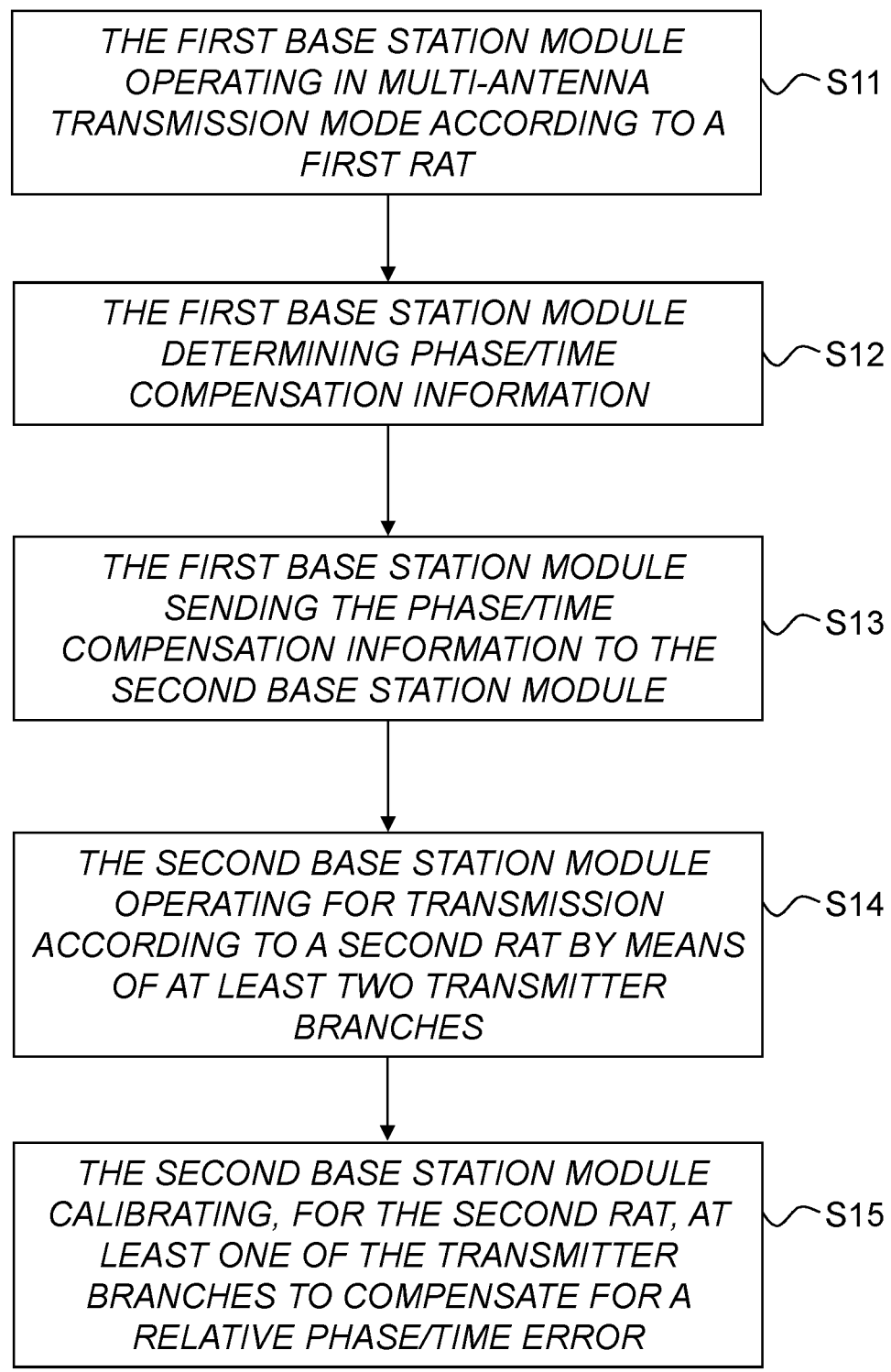
FIG. 4 is a schematic flow diagram illustrating an example of a method of transmitter branch calibration in a multi-standard base station site supporting at least two different radio access technologies according to an embodiment.

FIG. 4 is a schematic flow diagram illustrating an example of a method of transmitter branch calibration in a multi-standard base station site supporting at least two different radio access technologies according to an embodiment.

As previously outlined, the multi-standard base station site 10 comprises a first base station module 100 adapted for a first radio access technology and a second base station module 200 adapted for a second radio access technology, and a common radio and multi-antenna infrastructure 300 for the first and second base station modules comprising multiple transmitter branches.

At least the first base station module 100 comprises a precoder for precoding information symbols by means of a precoding matrix for multi-antenna transmission to a number of user equipment terminals.

Step S11 involves the first base station module 100 operating in multi-antenna transmission mode according to the first radio access technology by means of the multiple transmitter branches.

Step S12 involves the first base station module 100 determining phase/time compensation information based on feedback information representative of precoding matrix index, PMI, from at least one of the user equipment terminals.

Step S13 involves the first base station module 100 sending the phase/time compensation information to the second base station module.

Step S14 involves the second base station module 200 operating for transmission according to the second radio access technology by means of at least two of the multiple transmitter branches.

Step S15 involves the second base station module 200 calibrating, for operation according to the second radio access technology, at least one of the transmitter branches to compensate for a relative phase/time error between at least two of the transmitter branches based on the phase/time compensation information from the first base station module.

The terms 'compensation' and 'calibration' may be used interchangeably herein, as will be understood by the skilled person.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

The flow diagram or diagrams presented herein may therefore, where applicable, be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

With reference once again to FIG. 2, it can be appreciated that the multi-standard base station site 10 comprises, a first base station module 100 adapted for a first radio access technology, a second base station module 200 adapted for a second radio access technology, and a common radio and multi-antenna infrastructure 300 for the first and second base station modules comprising multiple transmitter branches. At least the first base station module 100 comprises a precoder configured to precode information symbols by means of a precoding matrix for multi-antenna transmission to a number of user equipment terminals. The first base station module 100 is configured to operate in multi-antenna transmission mode according to the first radio access technology by means of the multiple transmitter branches. The first base station module 100 is also configured to determine phase/time compensation information based on feedback information representative of precoding matrix index, PMI, from at least one of the user equipment terminals. The multi-standard base station site 10 is generally configured to perform, for operation according to the first radio access technology, a first compensation for a relative phase/time error between at least two of the transmitter branches based on the phase/time compensation information. The second base station module 200 is configured to operate for transmission according to the second radio access technology by means of at least two of the multiple transmitter branches. The multi-standard base station site 10 is also generally configured to perform, for operation according to the second radio access technology, a second compensation for a relative phase/time error between at least two of the transmitter branches based on the phase/time compensation information from the first base station module 100.

Figure 6:
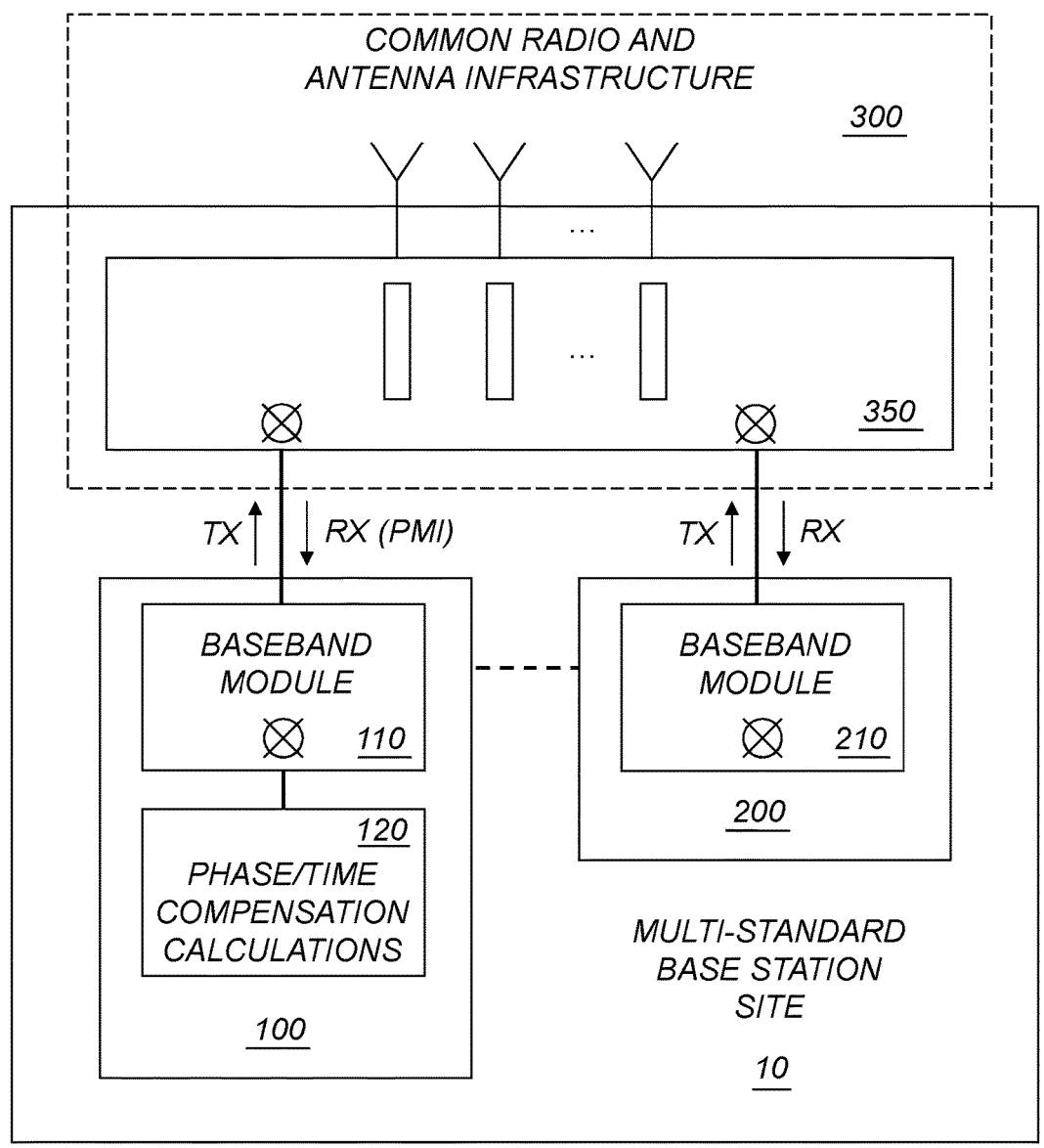
FIG. 6 is a schematic block diagram illustrating an example of a multi-standard radio base station site supporting at least two different radio access technologies according to a specific embodiment.

FIG. 6 is a schematic block diagram illustrating an example of a multi-standard radio base station site supporting at least two different radio access technologies according to a specific embodiment.

In this example, the first base station module 100 comprises a baseband module 110 and a module 120 for phase/time compensation calculations. Each base station module 100/200 has a transmission/reception, TX/RX, interface to a multi-standard radio module 350 of the common radio and antenna infrastructure 300. For example, this interface enables the first base station module 100 to receive PMI feedback from the UE terminals, which may then be detected by the baseband module 110 and transferred to the module 120 for phase/time compensation calculations. The interface also enables transmission of outgoing data by means of the common radio and antenna infrastructure 300.

The module 120 for phase/time compensation calculations is configured to determine phase/time compensation information such as one or more compensation parameters or calibration weights, or equivalent information representative thereof, based on the received PMI feedback.

The actual compensation for a relative phase/time error between at least two of the transmitter branches based on the phase/time compensation information can be performed in a number of alternative positions, as schematically indicated in FIG. 6.

For example, the multi-standard base station site 10 may be configured to perform, for operation according to the first radio access technology, the first compensation in the first base station module 100 or in a multi-standard radio module 350 of the common radio and antenna infrastructure 300. The multi-standard base station site 10 may be configured to perform, for operation according to the second radio access technology, the second compensation in the second base station module 200 or in the multi-standard radio module 350 of the common radio and antenna infrastructure 300.

The multi-standard base station site 10 may be configured to send the phase/time compensation information from the first base station module 100 to the second base station module 200 or the multi-standard radio module 350 to enable, for operation according to the second radio access technology, the second compensation for a relative phase/time error between at least two of the transmitter branches based on the phase/time compensation information.

As an example, the multi-standard base station site 10 may be configured to send the phase/time compensation information from the first base station module 100 to the second base station module 200, and the second base station module 200 is configured to perform, for operation according to the second radio access technology, the second compensation in the digital domain. The compensation is then preferably performed in the baseband module 210.

In a particular example, the multi-standard base station site 10 is configured to send the phase/time compensation information from the first base station module 100 to the second base station module 200 via said multi-standard radio module 350, using a first link from the first base station module 100 to the multi-standard radio module 350 and a second link from the multi-standard radio module 350 to the second base station module 200.

According to another example, the multi-standard base station site 10 is configured to send the phase/time compensation information from the first base station module 100 to the multi-standard radio module 350. The common multi-standard radio module 350 is then configured to perform, for operation according to the second radio access technology, the second compensation in the analog or digital domain. The multi-standard radio module 350 may be implemented as an analog radio or a digital radio.

The multi-standard base station site 10 may be configured to send the phase/time compensation information from the first base station module 100 to the second base station module 200 or the multi-standard radio module 350 via at least one Common Public Radio Interface, CPRI, link, Open Base Station Architecture Initiative, OBSAI, interface, and/or Optical Transmission Infrastructure, OTI, interface.

According to yet another example, the multi-standard base station site 10 is configured to send the phase/time compensation information from the first base station module 100 via a direct link, indicated by a dashed line in FIG. 6, to the second base station module 200. The optional direct link may by way of example be implemented as a CPRI link, an Ethernet link, a Rapid 10 interconnect, a Peripheral Component Interconnect, PCI, or any other suitable control interface.

As indicated in FIG. 6, the first compensation for operation according to the first RAT may be performed in the baseband module 110 of the first base station module 100.

Figure 7:
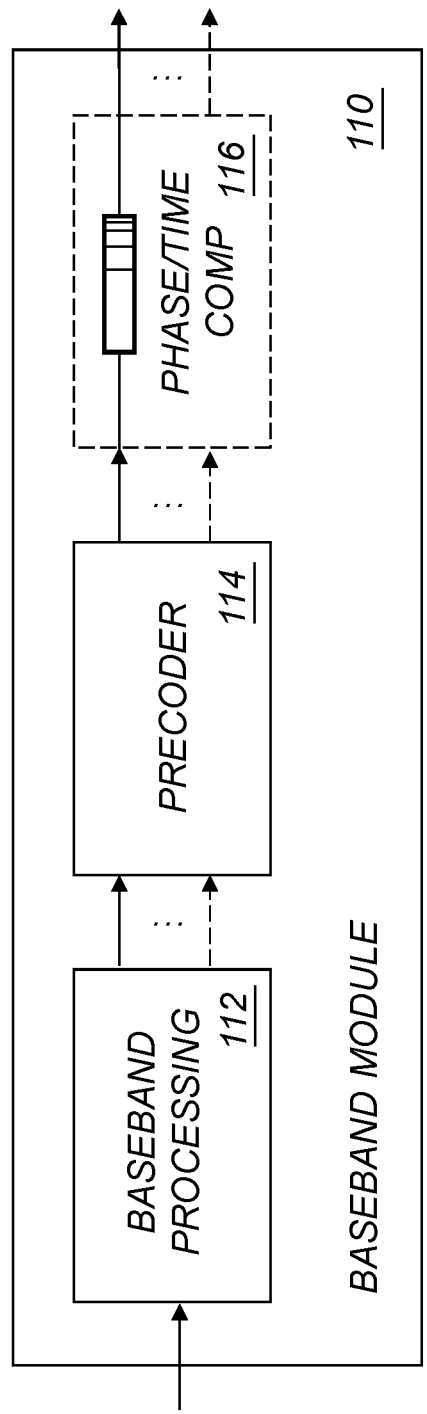
FIG. 7 is a schematic block diagram illustrating an example of a baseband module according to a specific embodiment.

FIG. 7 is a schematic block diagram illustrating an example of such a baseband module according to a specific embodiment. In this example, the first baseband module comprises a conventional baseband processing unit 112, and a precoder 114, as well as an optional phase/time compensation module 116, which may apply a phase/time compensation for at least one of the transmitter branches. This may be a controllable time delay in the time domain and/or a phase shift in the frequency domain, using any suitable filter implementation.

Figure 8:
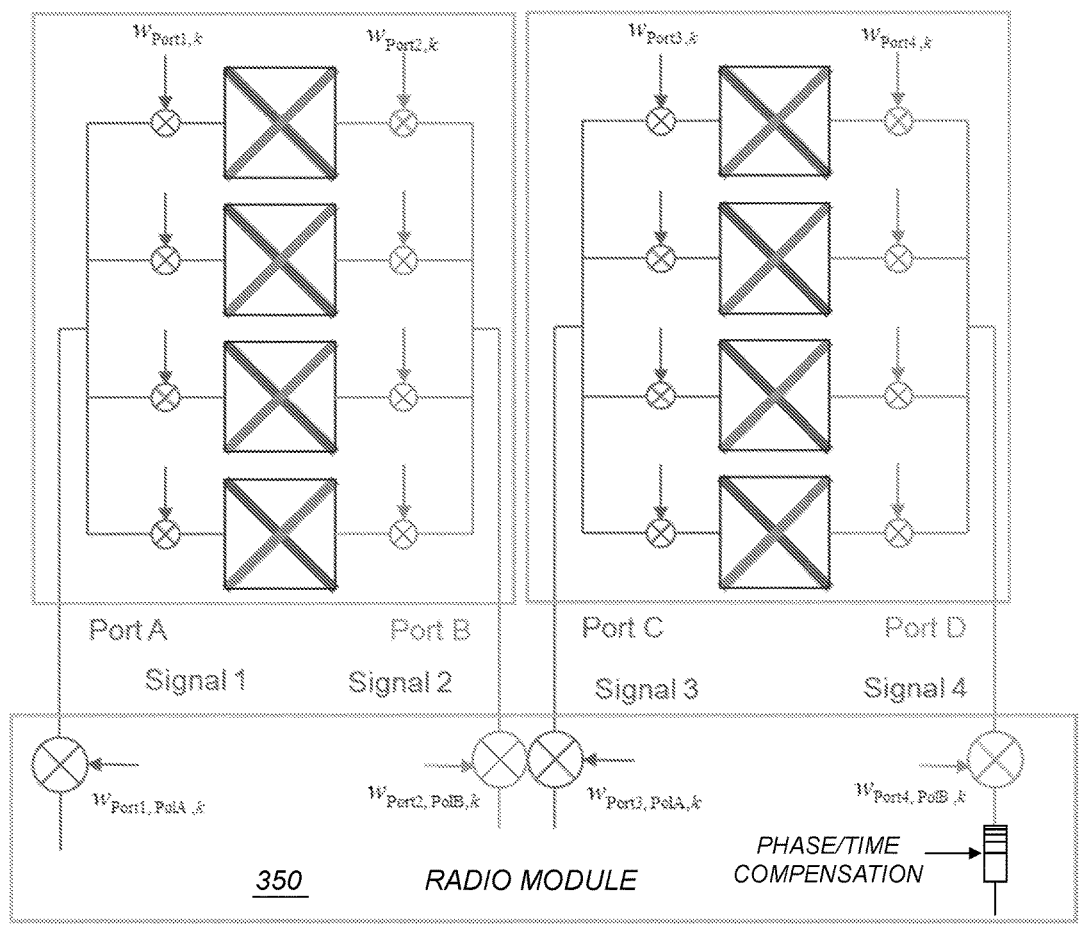
FIG. 8 is a schematic block diagram illustrating an example of a radio and multi-antenna infrastructure of a multi-standard radio base station site according to a specific embodiment.

FIG. 8 is a schematic block diagram illustrating an example of a radio and multi-antenna infrastructure of a multi-standard radio base station site according to a specific embodiment. In this example, signals are applied to four antenna ports A to D and phase/time compensation is here applied to one of the branches in the radio module 350 to compensate for a relative phase/time error between two of the branches. Preferably, compensation is performed between branches pair-wise, using one of the branches as an initial reference.

By way of example, the multi-standard base station site 10 is configured to perform, for operation according to the second radio access technology, the second compensation for a relative phase/time error between at least two of the transmitter branches based on the phase/time compensation information while adjusting for a difference in signal bandwidth and/or a difference in operating frequency between the first radio access technology and said second radio access technology.

In a particular example, the multi-standard base station site 10 may be configured to perform, for operation according to the second radio access technology, the second compensation while adjusting for a change in phase/time originating from at least one frequency-dependent component of the transmitter branch(es) when operating at the frequency of the second radio access technology instead of the frequency of the first radio access technology.

For example, the multi-standard base station site 10 may be configured to perform, for operation according to the second radio access technology, the second compensation while adjusting for a change in phase/time originating from at least one frequency-dependent component of the transmitter branch(es) based on information representative of a difference in filter characteristics at different operating frequencies.

Alternatively, the first base station module 100 may be configured to operate, during a period of time, in multi-antenna transmission mode according to the first radio access technology, but at the operating frequency of the second radio access technology, and to determine the phase/time compensation information based on feedback information representative of precoding matrix index, PMI, from at least one of the user equipment terminals during this period of time.

With reference once again to FIG. 2, there is also provided a multi-standard base station site 10 supporting at least two different radio access technologies, while implementing calibration for efficient operation according to the second radio access technology.

Basically, the multi-standard base station site 10 comprises a first base station module 100 adapted for a first radio access technology, a second base station module 200 adapted for a second radio access technology, and a common radio and multi-antenna infrastructure 300 for the first and second base station modules comprising multiple transmitter branches. At least the first base station module 100 comprises a precoder configured to precode information symbols by means of a precoding matrix for multi-antenna transmission to a number of user equipment terminals. The first base station module 100 is configured to operate in multi-antenna transmission mode according to the first radio access technology by means of the multiple transmitter branches. The first base station module 100 is also configured to determine phase/time compensation information based on feedback information representative of precoding matrix index, PMI, from at least one of the user equipment terminals. The first base station module 100 is configured to send the phase/time compensation information to the second base station module. The second base station module 200 is configured to operate for transmission according to the second radio access technology by means of at least two of the multiple transmitter branches. The second base station module 200 is configured to calibrate, for operation according to the second radio access technology, at least one of the transmitter branches to compensate for a relative phase/time error between at least two of the transmitter branches based on the phase/time compensation information from the first base station module.

As previously indicated, a specific non-limiting example relates to a multi-standard base station site in which the first base station module 100 is configured to operate according to Long Term Evolution, LTE and the second base station module 200 is configured to operate according to Code Division Multiple Access, CDMA, or Wideband Code Division Multiple Access, WCDMA.

Figure 9:
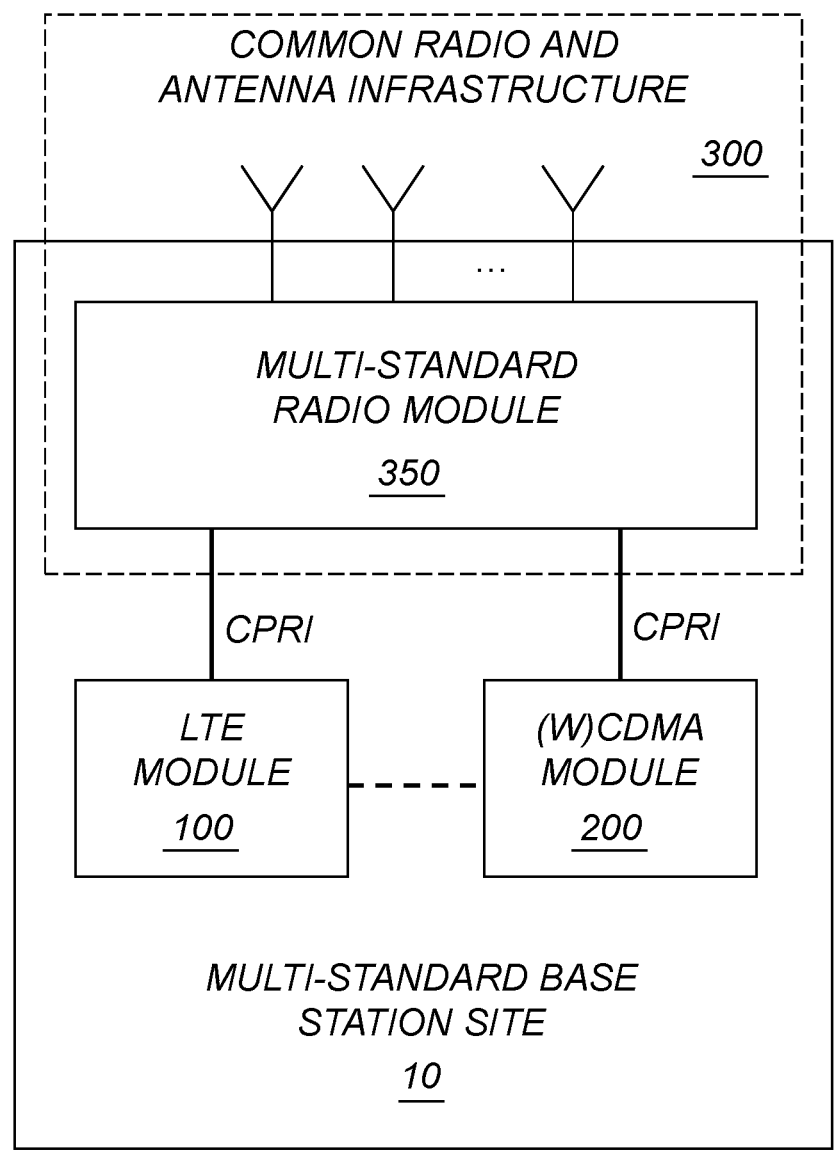
FIG. 9 is a schematic block diagram illustrating another example of a multi-standard radio base station site supporting at least two different radio access technologies according to a specific embodiment.

This is schematically illustrated in FIG. 9, where standard CPRI links are used for interconnecting the multi-standard radio module 350 to the LTE module 100 and WCDMA module 200. Other examples for interconnection include Open Base Station Architecture Initiative, OBSAI, interfaces, and/or Optical Transmission Infrastructure, OTI, interfaces.

The Precoding Matrix Indicator or Index, PMI, is used in LTE to indicate the preferred precoding matrix. This is normally done via UE feedback. For example, the UE calculates a measure of the quality it will achieve on the data channel for all possible entries in the pre-coder codebook. The index of the pre-coder matrix providing the "best" quality is then reported to the network together with the preferred rank and channel quality. Two different modes exist in LTE today. The precoding can be either wideband or frequency selective. For wide band precoding the same precoder is applied over the whole scheduled bandwidth, while for the frequency selective case, the UE report PMI per sub-band.

For example, a closed-loop calibration method has been derived based on the properties of the 4Tx codebook in LTE. By using this, expensive hardware calibration can be avoided.

An example of a possible calibration method is based on PMI reports from several UEs which are collected over a certain period of time. From statistics calculated on the PMI reports it is possible to estimate phase and time corrections between the antenna ports. From the statistics of the PMI reports, a frequency-dependent phase shift can be calculated. This frequency-dependent phase shift will then be applied to the baseband signal before transmission. By adding a phase shift to the transmitted signal on one or more antennas and observing the PMI statistics during a so-called calibration period, an absolute phase offset can also be estimated. The obtained parameters can then be used to correct for any misalignments in the transmitter branch(es). This may preferably be performed per carrier.

In this example, the calibration from LTE is sent to WCDMA/HSPA to apply calibration weights or corresponding parameters based on the calibration weights or parameters calculated for LTE.

Today there is no standardized signaling interface between the WCDMA and LTE baseband hardware. A possibility recognized by the inventors is to send the calibration information from LTE to the common radio module and further to WCDMA base-band via the CPRI or equivalent links. Alternatively, the calibration is applied to the WCDMA carriers in the common radio module.

Another way would be to introduce a direct link, as indicated by the dashed line in FIG. 9, and use that link for relaying the calibration information from LTE directly to the WCDMA hardware.

WCDMA/HSPA could in one embodiment use the phase/time calibration values obtained in LTE scaled for the different signal bandwidth.

Since the WCDMA/HSPA carriers may not be allocated on the same frequency as LTE there could be some options to correct this:

Since the coherency is rather static, start with LTE on the frequencies that WCDMA is allocated and get the calibration values. After the training period LTE could change to its assigned frequency.

A main contribution to the inaccuracy is the analogue filters. These filter characteristics, which can be measured and consequently known, could be compensated for by using e.g. look-up tables.

In the latter case, the filter characteristics such as values representative of the filter response may be known, e.g. from manufacturing, and stored in one or more look-up tables. When needed the stored value(s) may be accessed by the calibration procedure from the relevant look-up table entry to compensate for the difference in delay in the filter(s) caused by the difference in carrier frequency between LTE and (W)CDMA.

In this way, there is no need for new standardization for coherency loops for WCDMA, and no need for costly and inaccurate coherency calibration in factory. This also means increased economy of scale since the same multi-standard capable base station equipment can be 'fully' used by all concerned RATs.

Among other things, the embodiment of FIG. 9 enables the use of more than two antennas for transmission of the same HSPA/WCDMA signal with aligned lobes.

It should be understood that the above calibration information, such as calibration weights or values, is just an example of the more general phase/time compensation information used as a basis for compensating for a relative phase error between at least two of the transmitter branches.

The phase/time compensation information can even be represented by the obtained PMI values, which may be sent from the LTE base station module to the WCDMA base station module, and subsequently used by the WCDMA base station module to calculate applicable calibration weights.

Figure 10:
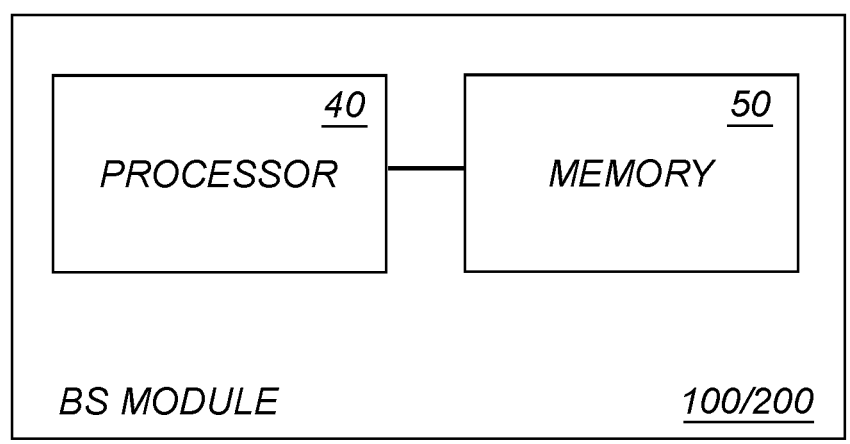
FIG. 10 is a schematic block diagram illustrating an example of a base station module according to a specific embodiment.

FIG. 10 is a schematic block diagram illustrating an example of a base station module according to a specific embodiment. In this particular example, each of the first base station module 100 and the second base station module 200 comprises a processor 40 and a memory 50, wherein the memory 50 comprises instructions executable by the processor 40 to perform operations of the module.

In this example, at least some of the steps, functions, procedures, modules and/or blocks described herein are implemented in a computer program, which is loaded into the memory 50 for execution by the processor 40. The processor 40 and memory 50 are interconnected to each other to enable normal software execution. An optional input/output device may also be interconnected to the processor 40 and/or memory 50 to enable input and/or output of relevant data such as input parameter(s) and/or resulting output parameter(s).

As indicated herein, at least part of the base station module may be defined as a group of function modules, where the function modules are implemented as a computer program running on a processor 50.

The computer program residing in memory 50 may thus be organized as appropriate function modules configured to perform, when executed by the processor 40, at least part of the steps and/or tasks described herein.

The computer program may be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD storage device, a flash memory, or any other conventional memory device. The computer program may thus be loaded into the operating memory of a computer or equivalent processing device for execution by the processing circuitry thereof.

The processor does not have to be dedicated to only execute the above-described steps, functions, procedure and/or blocks, but may also execute other tasks.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] WO 2008/082344
[2] WO 2008/082345
[3] WO 2010/087749
[4] WO 2013/119152

The invention claimed is:

1. A method of operating a multi-standard base station site supporting at least two different radio access technologies, wherein said multi-standard base station site comprises a first base station module adapted for a first radio access technology and a second base station module adapted for a second radio access technology, and a common radio and multi-antenna infrastructure for said first and second base station modules comprising multiple transmitter branches, wherein at least said first base station module comprises a precoder for precoding information symbols by means of a precoding matrix for multi-antenna transmission to a number of user equipment terminals, wherein said method comprises the steps of:
   said first base station module operating in multi-antenna transmission mode according to the first radio access technology by means of said multiple transmitter branches;
   said first base station module determining phase/time compensation information based on feedback information representative of precoding matrix index (PMI) from at least one of said user equipment terminals;
   said multi-standard base station site performing, for operation according to the first radio access technology, a first compensation for a relative phase/time error between at least two of said transmitter branches based on said phase/time compensation information;
   said second base station module operating for transmission according to the second radio access technology by means of at least two of said multiple transmitter branches; and
   said multi-standard base station site performing, for operation according to the second radio access technology, a second compensation for a relative phase/time error between at least two of said transmitter branches based on said phase/time compensation information from said first base station module; and
   wherein said first base station module is operating, during a period of time, in multi-antenna transmission mode according to the first radio access technology, but at the operating frequency of the second radio access technology, and determines said phase/time compensation information based on feedback information representative of precoding matrix index, PMI, from at least one of said user equipment terminals during said period of time.

2. The method of claim 1, wherein said multi-standard base station site performs, for operation according to the first radio access technology, said first compensation in said first base station module or in a multi-standard radio module of said common radio and antenna infrastructure, and wherein said multi-standard base station site performs, for operation according to the second radio access technology, said second compensation in said second base station module or in said multi-standard radio module of said common radio and antenna infrastructure.

3. The method of claim 2, wherein said first base station module sends said phase/time compensation information to said second base station module or said multi-standard radio module of said common radio and antenna infrastructure to enable, for operation according to the second radio access technology, said second compensation for a relative phase/time error between at least two of said transmitter branches based on said phase/time compensation information.

4. The method of claim 3, wherein said first base station module sends said phase/time compensation information to said second base station module, and said second base station module performs, for operation according to the second radio access technology, said second compensation in the digital domain.

5. The method of claim 4, wherein said phase/time compensation information is sent from said first base station module via a first link to said multi-standard radio module, and from said multi-standard radio module via a second link to said second base station module, or wherein said phase/time compensation information is sent from said first base station module via a direct link to said second base station module.

6. The method of claim 3, wherein said first base station module sends said phase/time compensation information to said multi-standard radio module, and said common multi-standard radio module performs, for operation according to the second radio access technology, said second compensation in the analog or digital domain.

7. The method of any of the claim 1, wherein said multi-standard base station site performs, for operation according to the second radio access technology, said second compensation for a relative phase/time error between at least two of said transmitter branches based on said phase/time compensation information, by adjusting for a difference in signal bandwidth and/or a difference in operating frequency between said first radio access technology and said second radio access technology.

8. The method of claim 7, wherein, when adjusting for a difference in operating frequency, said difference in operating frequency is a difference in carrier frequency between said first radio access technology and said second radio access technology.

9. The method of claim 7, wherein said multi-standard base station site performs, for operation according to the second radio access technology, said second compensation for a relative phase/time error between at least two of said transmitter branches based on said phase/time compensation information, by adjusting for a change in phase/time originating from at least one frequency-dependent component of said transmitter branch(es) when operating at the frequency of the second radio access technology instead of the frequency of the first radio access technology.

10. A multi-standard base station site supporting at least two different radio access technologies, wherein said multi-standard base station site (10) comprises:
   a first base station module adapted for a first radio access technology,
   a second base station module adapted for a second radio access technology, and
   a common radio and multi-antenna infrastructure for said first and second base station modules comprising multiple transmitter branches,
   wherein at least said first base station module comprises a precoder configured to precode information symbols by means of a precoding matrix for multi-antenna transmission to a number of user equipment terminals, wherein said first base station module is configured to operate in multi-antenna transmission mode according to the first radio access technology by means of said multiple transmitter branches, wherein said first base station module is configured to determine phase/time compensation information based on feedback information representative of precoding matrix index (PMI) from at least one of said user equipment terminals, wherein said multi-standard base station site is configured to perform, for operation according to the first radio access technology, a first compensation for a relative phase/time error between at least two of said transmitter branches based on said phase/time compensation information, wherein said second base station module is configured to operate for transmission according to the second radio access technology by means of at least two of said multiple transmitter branches, and wherein said multi-standard base station site is configured to perform, for operation according to the second radio access technology, a second compensation for a relative phase/time error between at least two of said transmitter branches based on said phase/time compensation information from said first base station module; and wherein said first base station module is operating, during a period of time, in multi-antenna transmission mode according to the first radio access technology, but at the operating frequency of the second radio access technology, and determines said phase/time compensation information based on feedback information representative of precoding matrix index, PMI, from at least one of said user equipment terminals during said period of time.

11. The multi-standard base station site of claim 10, wherein said multi-standard base station site is configured to perform, for operation according to the first radio access technology, said first compensation in said first base station module or in a multi-standard radio module of said common radio and antenna infrastructure, and wherein said multi-standard base station site is configured to perform, for operation according to the second radio access technology, said second compensation in said second base station module or in said multi-standard radio module of said common radio and antenna infrastructure.

12. The multi-standard base station site of claim 11, wherein said multi-standard base station site is configured to send said phase/time compensation information from said first base station module to said second base station module or said multi-standard radio module of said common radio and antenna infrastructure to enable, for operation according to the second radio access technology, said second compensation for a relative phase/time error between at least two of said transmitter branches based on said phase/time compensation information.

13. The multi-standard base station site of claim 12, wherein said multi-standard base station site is configured to send said phase/time compensation information from said first base station module to said second base station module, and said second base station module is configured to perform, for operation according to the second radio access technology, said second compensation in the digital domain.

14. The multi-standard base station site of claim 13, wherein said multi-standard base station site is configured to send said phase/time compensation information from said first base station module to said second base station module via said multi-standard radio module, using a first link from said first base station module to said multi-standard radio module and a second link from said multi-standard radio module to said second base station module, or wherein said multi-standard base station site is configured to send said phase/time compensation information from said first base station module via a direct link to said second base station module.

15. The multi-standard base station site of claim 10, wherein each of said first base station module and said second base station module comprises a processor and a memory, wherein the memory comprises instructions executable by the processor to perform operations of the respective module.

* * * * *